United States Patent [19]

Frank

[11] Patent Number: 4,532,949
[45] Date of Patent: Aug. 6, 1985

[54] ENERGY ABSORBER FOR HIGH ENERGY FLUID JET

[75] Inventor: Ed Frank, Glenolden, Pa.

[73] Assignee: The Boeing Company, Seattle, Wash.

[21] Appl. No.: 427,358

[22] Filed: Sep. 29, 1982

[51] Int. Cl.³ .............................................. F16L 55/02
[52] U.S. Cl. ........................................... 137/1; 83/53; 83/177; 137/802; 138/37
[58] Field of Search ............... 83/53, 177; 137/1, 802; 138/37; 239/120, 121

[56] References Cited

U.S. PATENT DOCUMENTS

| | | | |
|---|---|---|---|
| 1,892,649 | 12/1932 | Buenger | 138/37 X |
| 3,730,040 | 5/1973 | Chadwick et al. | 83/177 |
| 4,435,902 | 3/1984 | Mercer et al. | 83/53 X |

*Primary Examiner*—Gerald A. Michalsky
*Attorney, Agent, or Firm*—Jones, Tullar & Cooper

[57] ABSTRACT

An energy absorber for a high pressure and velocity fluid jet emanating from a nozzle is disclosed. An energy absorbing ball is freely rotatably supported in an energy absorbing chamber between seat faces. The high pressure and velocity fluid enters the energy absorbing zones and strikes the ball, causing it to rotate. The energy of the fluid is thereby substantially reduced. Since the ball is constantly in motion, a new surface is continually being brought into contact with the high energy fluid stream. This insures uniform wear of the ball as well as a long life. The ball and seats are disposed in a first end of a fluid flow conduit whose second end is carried in an adjustable support block which is in fluid communication with a fluid return line. The support block allows the spacing between the nozzle and the energy absorber to be varied to accommodate varying thicknesses of materials being cut by the high pressure fluid stream.

15 Claims, 13 Drawing Figures

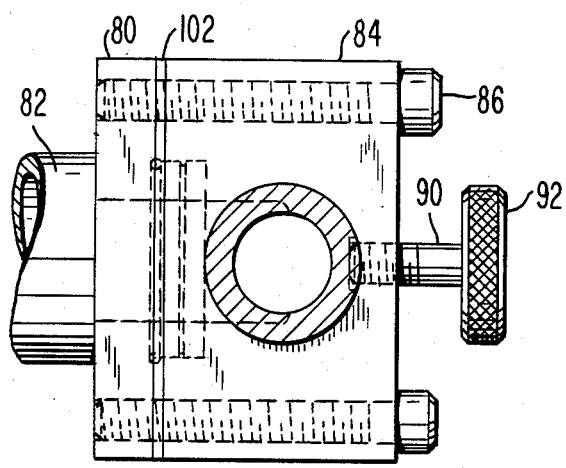
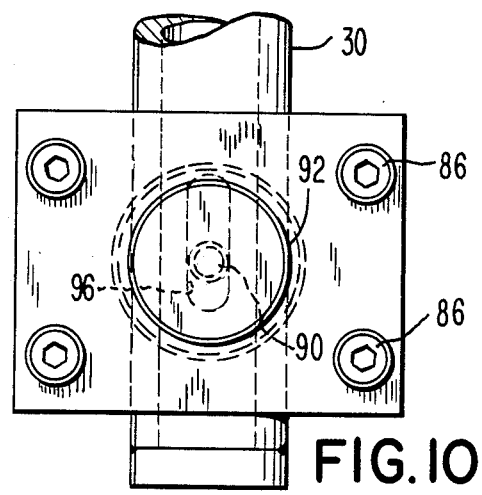
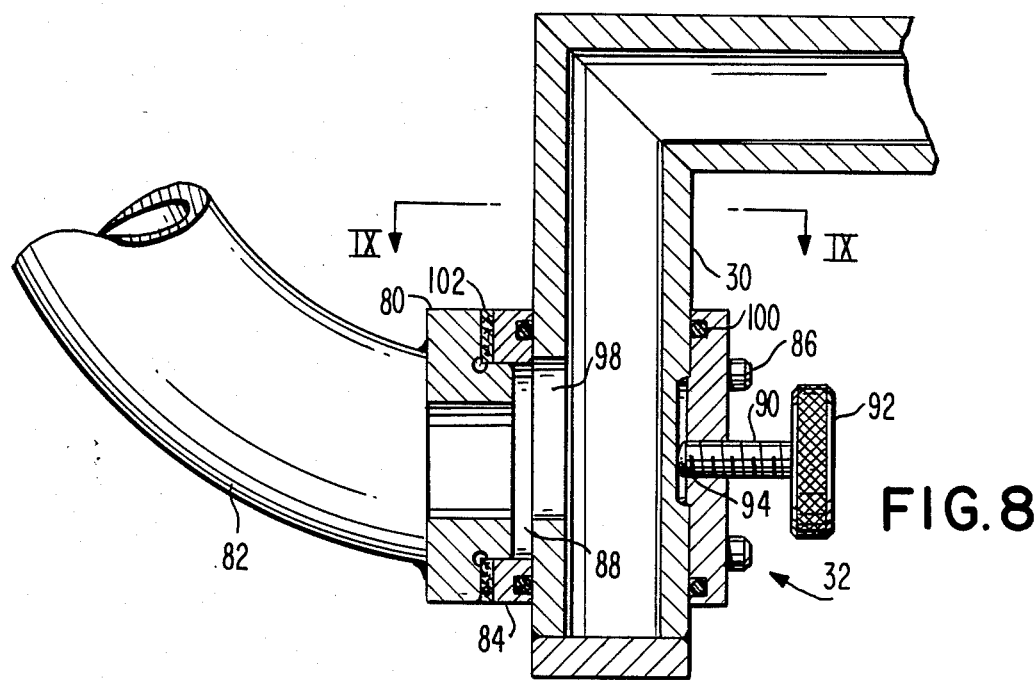
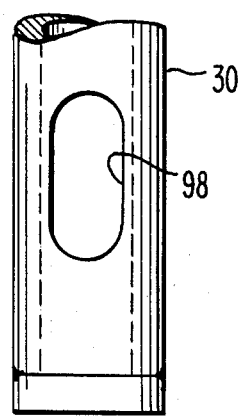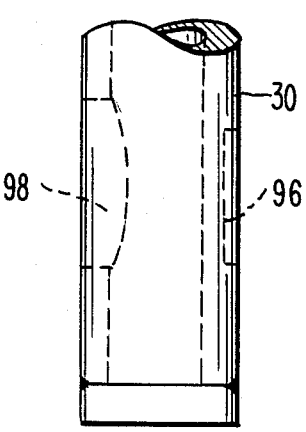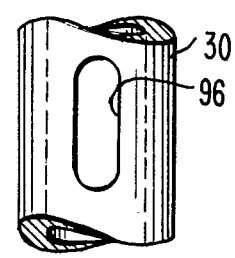

ENERGY ABSORBER FOR HIGH ENERGY FLUID JET

FIELD OF THE INVENTION

The present invention is directed generally to an energy absorber for a high energy fluid stream. More particularly, the present invention is directed to an energy absorber for a water jet router. Most particularly, the present invention is directed to an energy absorber for a water jet router which utilizes a freely rotatable ball. The ball is made of a wear resistant material such as carbide and is positioned in an energy absorbing chamber which receives the high pressure water stream. The ball is struck by the high pressure stream and is caused to rotate or spin within the chamber. Since the ball is caused to constantly spin by the impingement of the high pressure fluid stream against its surface, a new surface portion of the ball is continually being brought into contact with the stream. Uniform wear and long life of the energy absorbing ball are thus insured. The energy absorbing chamber is disposed in a fluid flow conduit whose spacing from the nozzle for the high pressure liquid stream is adjustable to vary the distance from the high pressure jet to the energy absorber, such adjustment being necessary in response to variations in thickness of the material being cut.

DESCRIPTION OF THE PRIOR ART

A high pressure stream or jet of fluid such as water has been found to be an effective tool for many cutting usages. This stream is typically forced from a nozzle as a thin, well defined, high velocity stream whose pressure may well be in the range of 50,000 to 100,000 psi. Such high pressure streams of water or other suitable fluids have found many industrial applications as cutters and routers since they produce a very clean, accurate and rapid cutting of numerous materials and compositions. Exemplary of prior art patents directed to high pressure liquid stream cutting devices are as follows:

| U.S. Pat. No. | Inventor |
| --- | --- |
| 2,985,050 | Schwacha |
| 3,212,378 | Rice |
| 3,524,367 | Franz |
| 3,532,014 | Franz |
| 3,750,961 | Franz |
| 3,756,106 | Chadwick et al. |
| 3,811,795 | Olsen |
| 4,029,440 | Olsen |
| 4,216,906 | Olsen et al. |

Once the fluid jet has cut the material on which it is being used, it is still necessary to collect the spent fluid which still has considerable energy. This high pressure liquid is typically returned to a reservoir or holding tank so that it can be re-pressurized and used again. In the patents to Schwacha, U.S. Pat. No. 2,985,050 and to Rice, U.S. Pat. No. 3,212,278, there are shown disposal tanks for receiving the still relatively high pressure fluid after it has contacted the material being cut. The disposal tanks disclosed in the above patents are recited as including energy absorbing means such as glass fiber, rubber blankets, liquids and the like. It will be appreciated that such disposal tanks are bulky, must be placed directly beneath the cutting area to receive the liquid jet thereby hindering movement of personnel, and are difficult to maintain and clean. Furthermore, the liquid which is received in these disposal tanks becomes adulterated with the energy absorbing materials and cannot be recycled without substantial reprocessing.

More recently in various industrial applications there has been provided an energy absorber for a high pressure liquid jet in the shape of a disk of hard material such as carbide. This disk is typically placed so as to be generally perpendicular to the spent high pressure liquid flow. Even though the disks are fabricated from hard, wear resistant materials, they have a life of only several hours and must be replaced frequently. Such replacement can be accomplished only when the high pressure stream has been shut off. Such a short life of the energy absorbing disk has an adverse effect on the productivity of the high pressure cutter. Furthermore, if the energy absorbing disk is not changed before it wears out, substantial harm can be done to the equipment and a safety hazard could be created.

Accordingly, there exists a need for an energy absorber for a high energy fluid device such as a liquid jet cutter or router which is small, rugged and reliable, which does not require a large amount of space, and which does not contaminate the cutting fluid.

SUMMARY OF THE INVENTION

It is an object of the present invention to provide an energy absorber for a high energy fluid jet.

Another object of the present invention is to provide an energy absorber which has a long life.

A further object of the present invention is to provide an energy absorber which is simple and compact.

Still another object of the present invention is to provide an energy absorber which does not add contaminants to the fluid being used.

Yet a further object of the present invention is to provide an energy absorber whose position with respect to the fluid nozzle is adjustable.

An additional object of the present invention is to provide an energy absorber in which the energy absorbing means is quickly and easily replaced.

Still a further object of the present invention is to provide a method for dissipating the energy of a high energy fluid.

As will be set forth in greater detail in the description of a preferred embodiment, the energy absorber in accordance with the present invention is comprised generally of a freely rotatable carbide ball carried in a carbide energy absorbing zone or chamber which is positionable in alignment with the high energy fluid nozzle. After the fluid has performed its cutting function, it passes through an aperture in the fluid flow conduit which carries the energy absorber and contacts the freely rotatable ball. The ball is aligned with the fluid jet nozzle but since the fluid stream is deflected during the cutting operation due to contact with the material being cut, the spent stream impinges the ball slightly away from the center of the ball. Accordingly, the ball is caused to spin in its chamber or housing and dissipates the high energy of the stream. The ball is free to rotate in a generally random manner so that all surfaces of the ball are exposed equally to the fluid jet.

Energy is dissipated in causing the ball to rotate as opposed to merely striking a static surface as in the prior art devices. The surface area which is contacted by the stream as the ball rotates is also significantly larger than was the small surface area of the disk or plate which was continually being contacted by the high pressure stream in the prior art devices. Where the life of the carbide disk which was previously used as an energy absorbing means was measured in hours, the life of the energy absorber in accordance with the present invention is a number of days. This substantial increase in operating life correspondingly reduces machine down time and results in increased production. When it is necessary to replace the rotatable ball, this is accomplished quickly and easily.

The rotatable ball energy absorber in accordance with the present invention is carried in an energy absorbing chamber that is located in a fluid flow conduit which is adjustably positioned in alignment with the cutting jet nozzle. This fluid flow conduit can be moved toward or away from the nozzle in accordance with the thickness of the material being cut by the high pressure liquid jet. Thus, the energy absorber can be positioned far enough away from the nozzle so as to not interfere with the cutting process but close enough so that there is little chance of the operator inadvertently contacting the liquid jet as it passes between the material being cut and the opening into the chamber for the rotatable ball.

While the rotatable ball is eventually worn away by the high pressure fluid, this wearing does not add a great deal of contamination to the liquid so that the liquid can be reused without requiring additional cleaning to remove contaminants added by the energy absorbing means, as was the case with some prior art devices.

It will be seen that the energy absorber for a high energy fluid jet in accordance with the present invention is simple in construction, long lasting and durable, easily replaced when worn out, non contaminating and highly effective in absorbing the energy of the high pressure fluid stream after the cutting has been accomplished.

BRIEF DESCRIPTION OF THE DRAWINGS

While the novel features of the energy absorber for a high energy fluid jet cutter in accordance with the present invention are set forth with particularity in the appended claims, a full and complete understanding of the invention may be had by referring to the description of a preferred embodiment as set forth hereinafter and as may be seen in the accompanying drawings in which:

Figure 7:
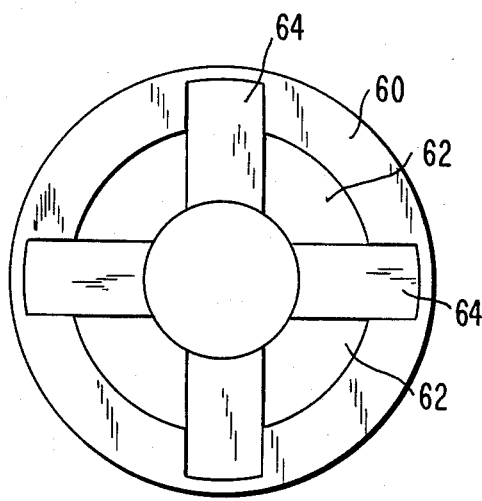
Figure 6:
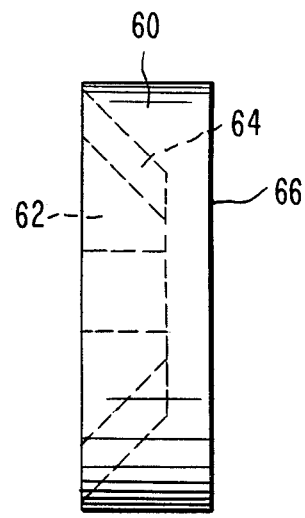

FIG, 6, is a side elevation view of the end seat of the energy absorber in accordance with the present invention;

FIG. 7, is an end view of the end seat of FIG. 6;

FIG. 8, is a side elevation view, partly in section, of the adjustable support for the energy absorber fluid flow conduit in accordance with the present invention;

FIG. 9, is a top plan view of the adjustable support taken along line IX—IX of FIG. 8;

FIG. 10, is a front elevation view of the adjustable support;

FIG. 11, is a side elevation view of the flow conduit for the energy absorber which is received in the adjustable support of FIG. 8;

FIG. 12, is a rear elevation view of the flow conduit of FIG. 11; and

FIG. 13, is a front elevation view of the fluid flow conduit of FIG. 11.

DESCRIPTION OF A PREFERRED EMBODIMENT

Figure 1:
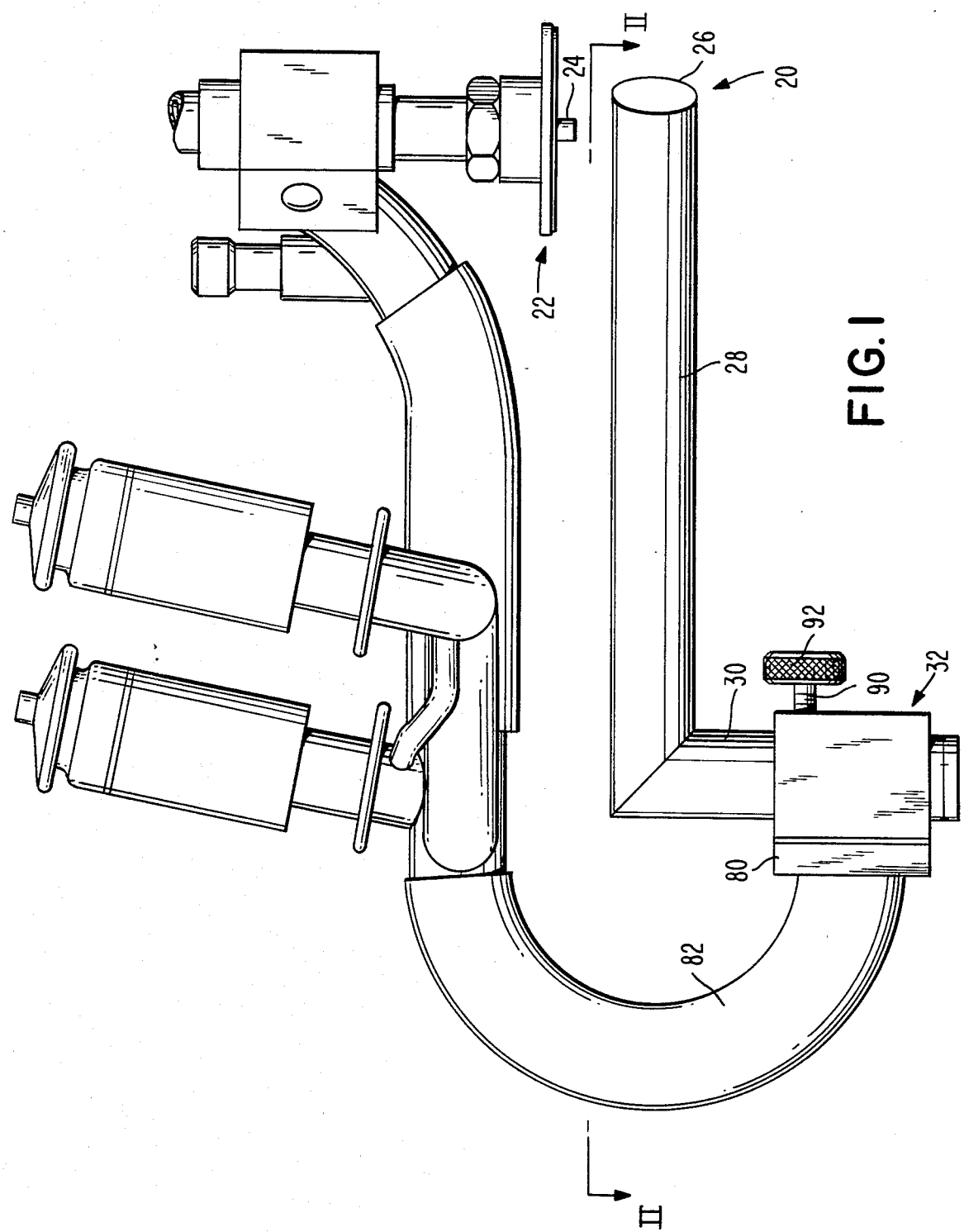
FIG. 1, is a side elevation view of the high energy fluid cutting jet nozzle and energy absorber in accordance with the present invention.

Referring initially to FIG. 1, there may be seen generally at 20 a preferred embodiment of an energy absorber in accordance with the present invention for use with a high energy fluid jet cutter. The fluid jet cutter is represented schematically at 22 and includes a nozzle 24 through which a fine stream of a high energy fluid such as water at a very high pressure, for example, in the range of 50,000 to 100,000 psi. Such liquid jet cutters are generally well known in the art and need not be discussed further. Energy absorber 20 is carried in the first end 26 of a fluid flow conduit 28 which is supported at a second end 30 in an adjustable support assembly 32 which will be described in greater detail subsequently.

Figure 2:
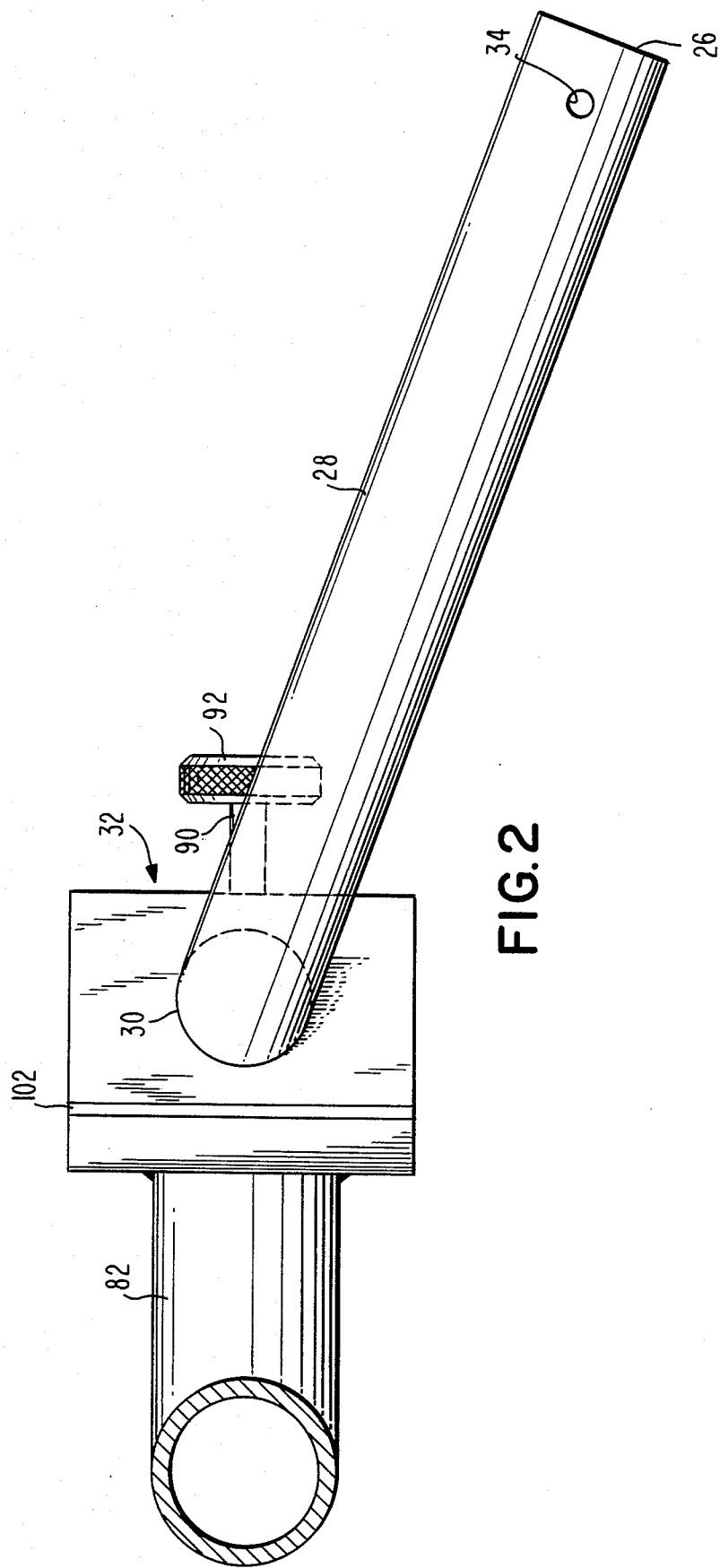
FIG. 2, is a top plan view, partly in section, of the energy absorber and adjustable support in accordance with the present invention taken along line II—II of FIG. 1.
Figure 3:
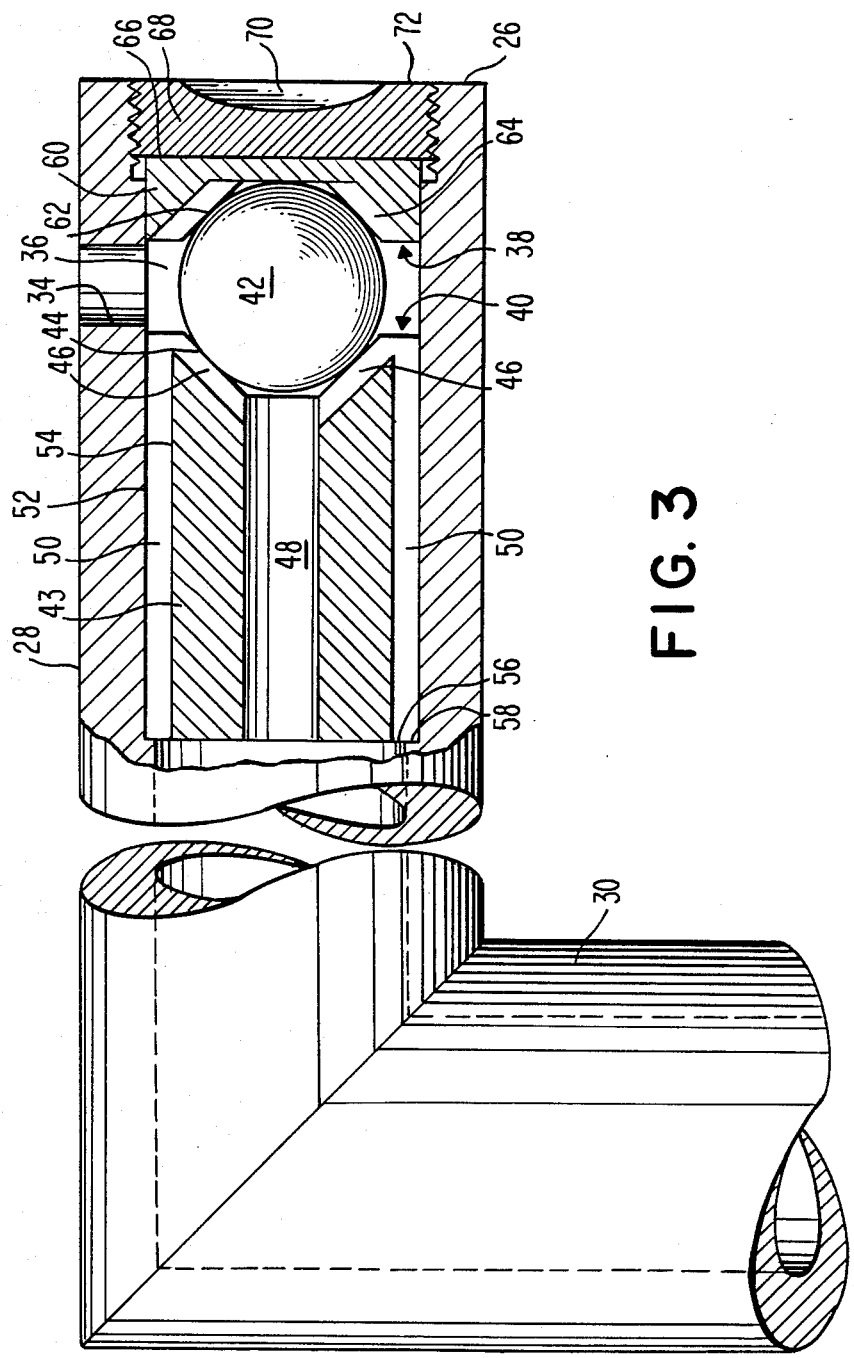
FIG. 3, is a side elevation view, partly in section of the energy absorber ball and seats in accordance with the present invention.
Figure 4:
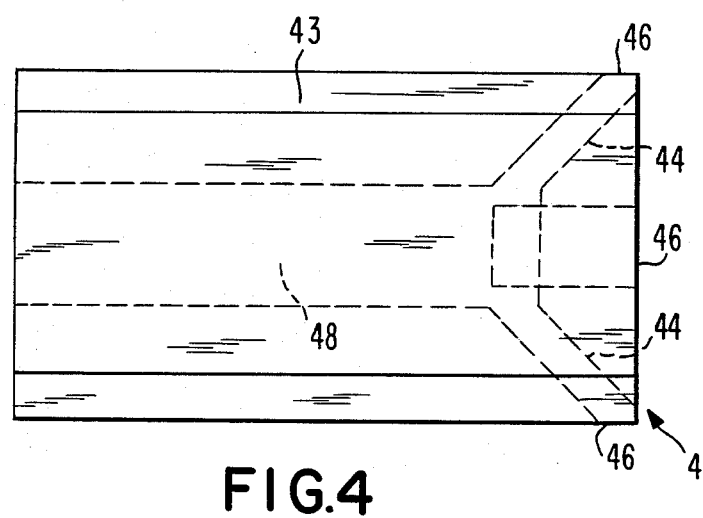
FIG. 4, is a side elevation view of the interior seat and flow guide of the present invention.
Figure 5:
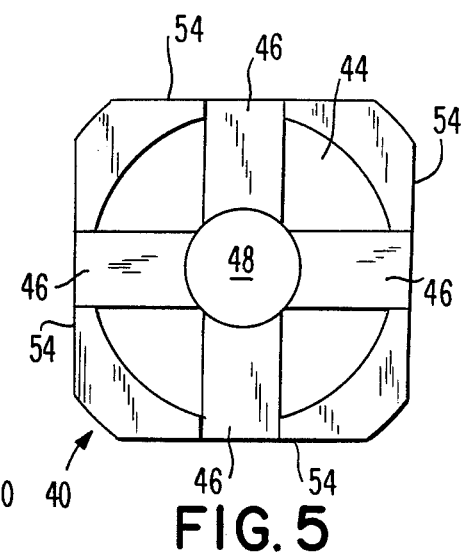
FIG. 5, is an end view of the interior seat of FIG. 4.

As may be seen in FIG. 2, fluid flow conduit 28 is provided with a high pressure liquid jet inlet aperture 34 on its upper surface adjacent first end 26. Aperture 34 directly underlies nozzle 24 of the high pressure liquid jet cutter 22 when energy absorber, generally at 20, is in its operative position. As is shown in FIG. 3, high pressure fluid jet inlet aperture 34 passes through fluid flow conduit 28 and into an energy absorbing zone or chamber 36 in the interior of pipe 28. Energy absorbing chamber 36 is defined by an end seat 38 and an interior seat 40 between which is positioned a freely rotatable ball 42. Both end seat 38 and interior seat 40 are fabricated from a hard, long life material such as carbide as is ball 42. As was previously alluded to, ball 42 is positioned between, seats 38 and 40 in a freely rotatable manner and is caused to rotate when struck by the high energy stream of fluid which enters through inlet aperture 34. Although ball 42 is positioned directly in line with nozzle 24, the stream of fluid will be deflected slightly as it contacts the material to be cut and hence will impinge ball 42 slightly off center so that ball 42 will be caused to spin and rotate in energy absorbing zone 36.

Referring now to FIGS. 3-7, the structure and function of end seat 38 and interior seat 40 may be seen in greater detail. Interior seat 40 is, as may be seen in FIGS. 4 and 5, an elongated truncated cylinder 43 having a seat face 44 at a first end. Seat face 44 is divided into four quadrants by radially extending flow grooves 46 which are cut into the face of seat face 44. These radially extending flow grooves extend radially outwardly from a central axial bore 48 to peripheral axially extending flow passages 50 defined as the spaces between the inner diameter 52 of fluid flow conduit 28 and the truncated surfaces 54 of cylinder 43. Cylinder 43 is retained from movement in the direction of fluid flow by engagement of its second end face 56 with an inwardly extending lip 58 formed by a reduction in the interior bore diameter of fluid flow conduit 28.

End seat 38 is, as may be seen most clearly in FIGS. 3, 6, and 7 generally shaped as a disk body 60 having a seat face 62 at a first end which is divided into quadrants by radially extending flow grooves 64. Disk body 60 is held against displacement in the interior of flow conduit 28 by the abutment of its second end face 66 against a threaded end plug 68. End plug 68 has a slot 70 in its outer face 72 which can receive a screw driver or similar tool. Rotation of end plug 68 will thus move end seat 38 with respect to interior seat 40 thereby providing a means to compensate for wear of ball 42. While ball 42 should be freely rotatable in energy absorbing zone 36, it should be prevented from undue pounding or hammering and hence the size of zone 36 can be reduced as the ball 42 wears.

Referring now to FIGS. 8–13, there may be seen more clearly the adjustable support assembly 32 for the second end 30 of fluid flow conduit 28. When the thickness of the material being cut by high pressure fluid jet nozzle 22 changes, it is necessary to adjust the spacing between nozzle 24 and inlet aperture 34. This is accomplished by sliding second end 30 of conduit 28 in the support assembly 32. A flange 80 is welded to the end of fluid return line 82 and a support block 84 is bolted to flange 82 by suitable bolts 86. Support block 84 is hollow and has an annular chamber 88 through which the second end 30 of fluid flow conduit 28 passes. A threaded clamp screw 90 which has a knurled head 92 is carried in a threaded hole in support block 84 with the inner end 94 of clamp screw 90 being received in an elongated recess 96 which is formed in the outer wall of the second end 30 of fluid flow conduit 28. An elongated ovoid aperture 98 is positioned diametrically opposite recess 96 and affords fluid flow from fluid flow conduit 28 to fluid return line 82 through chamber 88. It will thus be apparent that the spacing between fluid jet nozzle 22 and inlet aperture 34 in fluid flow conduit 28 can be varied by loosening clamp screw 90 and by sliding second end 30 of conduit 28 in support block 84. Suitable seals such as O-rings 100 are provided between conduit 28 and support block 84. A sealing gasket 102 is placed between support block 84 and flange 80 to insure that there is little or no leakage of the fluid.

In operation, high pressure and velocity fluid such as water is expelled from nozzle 24 and acts on whatever material is placed adjacent nozzle 24. The fluid, after having performed its intended function, is still under high pressure and passes through inlet aperture 34 into energy absorbing zone 36 where it contacts carbide ball 42 that is freely rotatable between end seat 38 and interior seat 40. The fluid strikes ball 42 and causes it to rotate thereby dissipating the energy of the fluid. This fluid then passes through flow grooves 64 in seat face 62 of end seat 38 and through radial grooves 46 in seat face 44 of interior seat 40 and thence through annular bore 48 and peripheral flow passages 50 of the elongated truncated cylinder 43. The fluid conduit 28 has a vacuum impressed thereon by any suitable means (not shown) to insure that the fluid does not build up in the energy absorbing zone 36, in the flow conduit 28 or in the connection between the second end 30 of flow conduit 28 and the fluid return line 82.

As was set forth previously, the energy absorber in accordance with the subject invention is rugged and durable, functions effectively to absorb the energy of the high pressure and velocity fluid, provides means to vary the spacing of the absorber and jet nozzle, and is easily adjusted or serviced. While a preferred embodiment of the energy absorber in accordance with the present invention has been fully and completely set forth hereinabove, it will be obvious to one of skill in the art that a number of changes, in for example, the materials used, the number of fluid flow grooves, and the like could be made without departing from the true spirit and scope of the invention which is accordingly to be limited only by the appended claims.

I claim:

1. An energy absorber for absorbing energy from a high energy fluid stream emanating from a high energy fluid nozzle, said energy absorber comprising:
    an energy absorbing chamber adapted to receive the high energy fluid stream emanating from the high energy fluid nozzle and being defined by spaced first and second seats positioned within a fluid flow conduit which is spaced from the high energy fluid nozzle, said first and said second seats including first and second seat faces forming a portion of said energy absorbing chamber;
    an inlet aperture in said fluid flow conduit, the high energy fluid passing through said inlet aperture and into said energy absorbing chamber;
    a freely rotatable ball positioned in said energy absorbing chamber between said first and second seats generally in alignment with the high energy fluid stream, said ball being struck and caused to rotate by the high energy fluid stream to dissipate the energy of the high energy fluid stream; and,
    means to exhaust the energy dissipated fluid from said energy absorbing chamber after the energy of the fluid has been absorbed and dissipated by causing said ball to rotate, said means including first and second fluid flow passages in said first and said second seat faces, said first and said second fluid flow passages directing said energy dissipated fluid from said energy absorbing chamber to said fluid flow conduit.

2. The energy absorber of claim 1, wherein said inlet aperture is directly aligned with an outlet portion of the high energy fluid nozzle.

3. The energy absorber of claim 2, wherein said freely rotatable ball is positioned in said energy absorbing chamber in alignment with said inlet aperture.

4. The energy absorber of claim 1, wherein said first seat face is formed as a first end of an elongated truncated cylinder positioned in said fluid flow conduit.

5. The energy absorber of claim 4, further wherein said first flow passages in said first seat face include first fluid flow grooves communicating with a central axial bore and peripheral axial flow passages in said elongated, truncated cylinder.

6. The energy absorber of claim 1, wherein said second seat face is formed as a first end of a disk body positioned in said fluid flow conduit.

7. The energy absorber of claim 6, wherein a second end of said disk body abuts an end plug, said end plug being adjustably secured in said fluid flow conduit whereby said spacing between said first and second seats may be adjusted.

8. The energy absorber of claim 1, further wherein said fluid flow conduit is adjustably secured to a fluid return line by an adjustable support assembly whereby the spacing between said nozzle and said means for introducing the high energy fluid into said energy absorbing chamber may be varied.

9. The energy absorber of claim 8, wherein said support assembly includes a threaded clamp screw which passes through said support and is received in an elongated recess in a wall of said fluid flow conduit.

10. The energy absorber of claim 9, further wherein an elongated ovoid aperture is provided in a wall of said fluid flow conduit diametrically opposite said recess, said ovoid aperture being in fluid communication with said fluid return line.

11. The energy absorber of claim 1, wherein a vacuum is impressed on said energy absorbing chamber to aid in exhausting the fluid from said chamber.

12. The energy absorber of claim 1, wherein said freely rotatable ball and said first and second seats are carbide.

13. The energy absorber of claim 1, wherein said high energy fluid stream is a fine high pressure stream of water.

14. A method for absorbing energy from a high energy fluid stream emanating from a source of high energy fluid, said method comprising the steps of:
    providing an energy absorbing chamber for receiving the high energy fluid from the high energy fluid source, said energy absorbing chamber being defined by spaced first and second seats positioned in a fluid flow conduit, said first and said second seats including first and second seat faces forming a portion of said energy absorbing chamber;
    spacing said energy absorbing chamber from the high energy fluid source;
    positioning a freely rotatable ball in said energy absorbing chamber;
    directing the high energy fluid from the high energy fluid source into said energy absorbing chamber and into contact with said ball;
    causing said ball to rotate in said energy absorbing chamber by contacting said ball with the high energy fluid stream emanating from the source of high energy fluid to dissipate the energy of the high energy fluid; and
    removing the fluid whose energy has been dissipated in said energy absorbing chamber by causing rotation of said ball in said energy absorbing chamber from said chamber by directing said energy dissipated fluid through first and second fluid flow passages in said first and said second seat faces from said energy absorbing chamber to said fluid flow conduit.

15. The method of claim 14, further including the step of causing the high energy fluid stream to impinge against said ball at a point away from the center of said ball to cause said ball to rotate in said energy absorbing chamber.

* * * * *